US011346937B2

(12) United States Patent
Klein et al.

(10) Patent No.: US 11,346,937 B2
(45) Date of Patent: May 31, 2022

(54) REMOTE TRACKING OF PROGRESS AT CONSTRUCTION SITES

(71) Applicant: International Business Machines Corporation, Armonk, NY (US)

(72) Inventors: Levente Klein, Tuckahoe, NY (US); Roobina Ohanian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 16/436,877

(22) Filed: Jun. 10, 2019

(65) Prior Publication Data
US 2020/0386882 A1 Dec. 10, 2020

(51) Int. Cl.
*G01S 13/88* (2006.01)
*B64C 39/02* (2006.01)
(Continued)

(52) U.S. Cl.
CPC ............ *G01S 13/88* (2013.01); *B64C 39/024* (2013.01); *B64D 47/00* (2013.01); *G01S 13/003* (2013.01);
(Continued)

(58) Field of Classification Search
None
See application file for complete search history.

(56) References Cited

U.S. PATENT DOCUMENTS 6,711,280 B2 3/2004 Stafsudd
6,900,758 B1 5/2005 Mann
(Continued)

FOREIGN PATENT DOCUMENTS

| EP | 2469299 A1 | 6/2012 | |
|---|---|---|---|
| KR | 1020160034013 A | * 3/2016 | ............. G06Q 50/08 |
| WO | 03089889 A1 | 10/2003 | |

OTHER PUBLICATIONS

I. Motawa et al, "Unmanned Aerial Vehicles (UAVS) for Inspection in Construction and Building Industry"; Proceedings of the 16th International Operation and Maintenance Conference; Cairo, Egypt. (Year: 2018).*

(Continued)

*Primary Examiner* — Bernarr E Gregory
(74) *Attorney, Agent, or Firm* — Aaron N. Pontikos

(57) ABSTRACT

A system and method provide remote tracking of progress at construction sites. When possible, the progress can be monitored remotely via satellite imagery. But once satellite imagery cannot determine the progress that needs to be monitored at the construction site, multiple unmanned aerial vehicles (UAVs) that use RF emitters and receivers are deployed to the construction site to determine progress based on RF scans. A number and type of UAVs, along with their respective flight plans, are determined from site specifications and expected progress at the construction site. The UAVs are programmed with their respective flight plans, synchronized, then deployed to inspect the construction site using RF scans. The UAVs execute their respective flight plans, with some emitting RF signals and others receiving those emitted RF signals. The UAV RF data is then analyzed and compared to the site specifications to determine the progress at the construction site.

20 Claims, 9 Drawing Sheets

(51) Int. Cl.

| | | |
|---|---|---|
| *B64D 47/00* | (2006.01) | |
| *G01S 13/00* | (2006.01) | |
| *G05D 1/00* | (2006.01) | |
| *G06Q 10/10* | (2012.01) | |
| *G06Q 50/08* | (2012.01) | |
| *B64C 39/00* | (2006.01) | |

(52) U.S. Cl.
CPC ......... *G05D 1/0027* (2013.01); *G06Q 10/103* (2013.01); *G06Q 50/08* (2013.01); *B64C 2201/12* (2013.01)

(56) References Cited

U.S. PATENT DOCUMENTS

| | | | |
|---|---|---|---|
| 9,466,144 B2 | 10/2016 | Sharp et al. | |
| 10,460,173 B2* | 10/2019 | Sasson | G06Q 50/08 |
| 10,546,371 B1* | 1/2020 | Pyznar | G06F 30/13 |
| 10,684,137 B2* | 6/2020 | Kean | G06V 20/13 |
| 2013/0155058 A1* | 6/2013 | Golparvar-Fard | G06Q 10/06311 345/419 |
| 2016/0019458 A1 | 1/2016 | Kaufhold | |

OTHER PUBLICATIONS

J. Howard et al., "Can Drones Make Construction Safer?"; published on the website for the Centers for Disease Control and Prevention; Atlanta, Georgia, USA; Oct. 23, 2017. (Year: 2017).*

R. Ashour et al, "Site Inspection Drone: A Solution for Inspecting and Regulating Construction Sites"; published in the proceedings of the 2016 IEEE 59th International Midwest Symposium on Circuits and Systems; Oct. 2016; published by IEEE, Piscataway, NJ, USA. (Year: 2016).*

N. Anwar et al., "Construction Monitoring and Reporting using Drones and Unmanned Aerial Vehicles (UAVs)"; published in the proceedings of The Tenth International Conference on Construction in the 21st Century (CITC-10); Jul. 2018; Columbo, Sri Lanka; pp. 325-332. (Year: 2018).*

Computer Translation of WO03089889, published Oct. 30, 2003.

Themistocleous, et al., "Damage assessment using advanced non-intrusive inspection methods: Integration of space, UAV, GPR and Field Spectroscopy", Proceedings of the SPIE, vol. 9229, Apr. 2014.

"PLLs With Integrated VCO—SMT", Analog Devices, provided by Inventors Sep. 2018, 52 pages, <http://www.analog.com/media/en/technical-documentation/data-sheets/hmc835.pdf>.

Browne, Jack, "Low-Noise Integrated PLL Synthesizes 10 MHz to 15 GHz", Jun. 27, 2017, Microwaves&RF, 4 pages, <http://www.mwrf.com/systems/low-noise-integrated-pll-synthesizes-10-mhz-15-ghz>.

Curtin et al., "Phase-locked loops for high-frequency receivers and transmitters—Part 1", <http://www.analog.com/en/analog-dialogue/articles/pll-for-high-frequency-receivers-and-transmitters-1.html>, 9 pages, provided by Inventors Sep. 2018.

* cited by examiner

| Material RF Absorption Data | | | | | | |
|---|---|---|---|---|---|---|
| Material | 125 Hz | 250 Hz | 500 Hz | 1 kHz | 2 kHz | 4 kHz |
| Brick | 3% | 3% | 3% | 4% | 5% | 7% |
| Carpet on concrete, foam rubber pad | 8% | 24% | 57% | 69% | 71% | 73% |
| Drapes | 14% | 35% | 55% | 72% | 70% | 65% |
| Drywall | 29% | 10% | 5% | 4% | 7% | 9% |
| Vinyl Flooring on concrete | 2% | 3% | 3% | 3% | 3% | 2% |
| Wood Paneling | 28% | 22% | 17% | 9% | 10% | 11% |
| Plaster over lath | 14% | 10% | 6% | 5% | 4% | 9% |
| Window Glass | 35% | 25% | 18% | 12% | 7% | 4% |
| Wood | 15% | 11% | 10% | 7% | 7% | 4% |

| UAV 610 Flight Plan (Emitter UAV) ||||||| 
|---|---|---|---|---|---|---|
| Step | Start Time | Stop Time | Coordinates | Direction | Frequency | Type |
| 1 | T | T+10 | 52,286,4 | 0 | 500 Hz | Continuous |
| 2 | T+20 | T+30 | 52,286,10 | 0 | 250 Hz | 30% pulse |
| 3 | T+40 | T+50 | 52,375,14 | 0 | 1 kHz | 70% pulse |
| 4 | T+60 | T+70 | 52,375,7 | 0 | 125 Hz | Continuous |
| ⋮ | ⋮ | ⋮ | ⋮ | ⋮ | ⋮ | ⋮ |
| N | T+Q | T+R | $x_1,y_1,z_1$ | S | P | Type |

810

| UAV 620 Flight Plan (Receiver UAV) | | | | |
|---|---|---|---|---|
| Step | Start Time | Stop Time | Coordinates | Direction |
| 1 | T | T+10 | 223,286,4 | 180 |
| 2 | T+20 | T+30 | 223,286,10 | 180 |
| 3 | T+40 | T+50 | 223,375,14 | 180 |
| 4 | T+60 | T+70 | 223,375,7 | 180 |
| ⋮ | ⋮ | ⋮ | ⋮ | ⋮ |
| N | T+Q | T+R | $x_2, y_2, z_2$ | S |

REMOTE TRACKING OF PROGRESS AT CONSTRUCTION SITES

BACKGROUND

1. Technical Field

This disclosure generally relates to construction projects, and more specifically relates to remote tracking of progress at construction sites.

2. Background Art

Construction projects can take months or years to complete. When a construction site is located some distance away, monitoring the progress at the site typically requires a person travel to the construction site and visually identify the progress. This can be time-consuming and expensive, especially when many periodic inspections are needed to track the progress.

Unmanned aerial vehicles (UAVs), often called "drones", can include cameras that allow viewing things remotely. Thus, instead of traveling to a construction project to track progress, a person could fly a UAV to the construction site to track progress. Visually tracking progress from a remote location using a UAV would work well when the progress can be easily seen visually from the exterior of a building. However, once the building walls, windows and roof are in place, a visual inspection of the outside of the building cannot determine whether certain interior work has been done, including drywall, carpeting, etc.

BRIEF SUMMARY

A system and method provide remote tracking of progress at construction sites. When possible, the progress can be monitored remotely via satellite imagery. This progress can be either visualizing the ground that is leveled for construction, development of roads that connect the site to the outer world, development of material storage spaces, excavation of the ground, etc. But once the building envelope is constructed and satellite imagery cannot see inside the buildings to track the progress that needs to be monitored at the construction site, multiple unmanned aerial vehicles (UAVs) that use RF emitters and receivers are deployed to the construction site to determine progress based on RF scans. A number and type of UAVs, along with their respective flight plans, are determined from site specifications and expected progress at the construction site. The UAVs are programmed with their respective flight plans, synchronized, then deployed to inspect the construction site using RF scans. The UAVs execute their respective flight plans, with some emitting RF signals and others receiving those emitted RF signals. The UAV RF data is then analyzed and compared to the site specifications to determine the progress at the construction site.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 4 is a table showing material RF absorption data for some common materials at construction sites;

DETAILED DESCRIPTION

A system and method provide remote tracking of progress at construction sites. When possible, the progress can be monitored remotely via satellite imagery. But once satellite imagery cannot determine the progress that needs to be monitored at the construction site, multiple unmanned aerial vehicles (UAVs) that use RF emitters and receivers are deployed to the construction site to determine progress based on RF scans. A number and type of UAVs, along with their respective flight plans, are determined from site specifications and expected progress at the construction site. The UAVs are programmed with their respective flight plans, synchronized, then deployed to inspect the construction site using RF scans. The UAVs execute their respective flight plans, with some emitting RF signals and others receiving those emitted RF signals. The UAV RF data is then analyzed and compared to the site specifications to determine the progress at the construction site.

Figure 1:
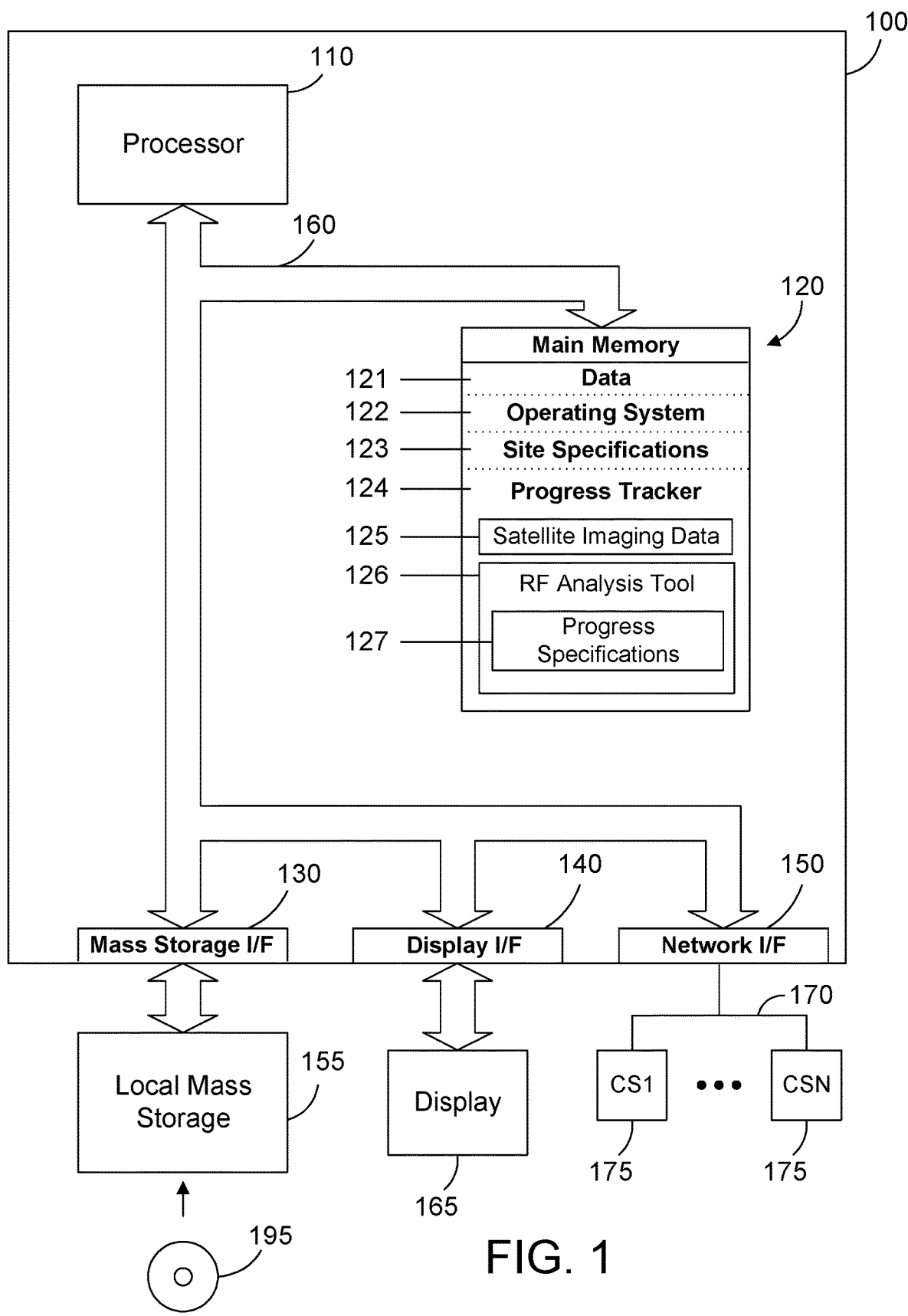
FIG. 1 is a block diagram of a computer system that includes a progress tracker.

Referring to FIG. 1, a computer system 100 is one suitable implementation of a computer system that includes a progress tracker as described in more detail below. Computer system 100 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such as a flash drive.

Main memory 120 preferably contains data 121, an operating system 122, site specifications 123, and a progress tracker 124. Data 121 represents any data that serves as input to or output from any program in computer system 100. Operating system 122 is a multitasking operating system, such as AIX or LINUX. The site specifications 123 preferably include specifications for completion of the construction site at different dates. Site specifications 123 can include any suitable aspect or phase of a construction project. For example, for construction of a building on a concrete slab, site specifications 123 could specify different dates for various phases of the construction site, such as: completion of initial excavation work; the completion of a concrete foundation; the completion of a concrete slab; the completion of exterior walls; the completion of the roof structure; the completion of the roofing materials on the roof structure; the completion of installing insulation in the attic; the completion of the rough electrical work; the completion of the rough plumbing; the completion of the heating/air conditioning system; the completion of the interior drywall; the completion of floor coverings; the completion of appliance installation; and the completion of window coverings. These various phases in the example above are given by way of example. A construction project can have any suitable number or type of steps or phases that could be represented in the site specifications 123. The dates in the site specifications 123 can be adjusted, as needed. For example, if the initial excavation work is delayed by two months due to rainy weather, the dates for all subsequent phases can be extended two months. The site specifications 123 herein expressly include any suitable number and types of steps for representing partial completion of a construction project, along with dates for each step, so the expected partial completion for the construction project on a specified date can be readily determined.

Figure 2:
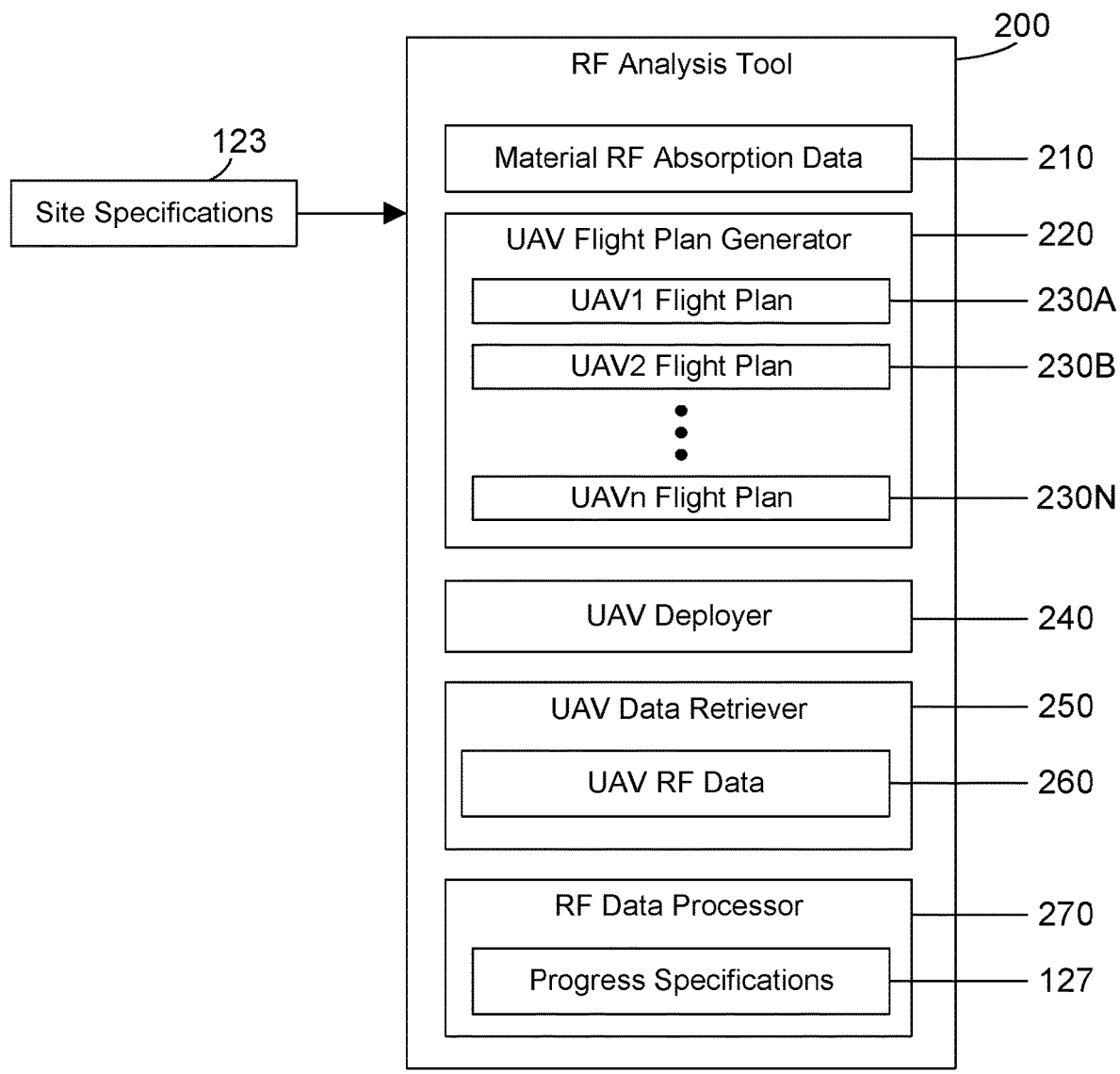
FIG. 2 is a block diagram showing some example components in an RF analysis tool.

The progress tracker 124 preferably includes satellite imaging data 125 and a radio frequency (RF) analysis tool 126. The progress tracker 124 can use the satellite imaging data 125 to detect progress when the progress can be determined from the satellite imaging data 125. In the example above, the completion of the initial excavation work could likely be verified from the satellite imaging data 125. However, when the satellite imaging data 125 cannot indicate the progress, such as the installation of items on the interior of a building, the RF analysis tool 126 uses multiple unmanned aerial vehicles (UAVs), one or more of which include an RF emitter and one or more of which include an RF receiver, to perform RF scans of the construction site to determine based on UAV RF data the progress at the construction site. The RF analysis tool 126, after analyzing the UAV RF data, generates progress specifications 127 that specify what items on the construction site have been completed based on the UAV RF data. The progress specifications 127 can then be compared to the expected progress derived from the site specifications 123 to determine progress at the construction site. One specific example of the RF analysis tool 126 is shown in FIG. 2 and is discussed in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, site specifications 123 and progress tracker 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the progress tracker 124.

Although computer system 100 is shown to contain only a single processor and a single system bus, those skilled in the art will appreciate that a progress tracker as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175, shown as CS1, . . . , CSN in FIG. 1, represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 2, an RF analysis tool 200 is shown, which is one particular implementation for the RF analysis tool 126 shown in FIG. 1. The RF analysis tool 200 includes material RF absorption data 210 that is a database of RF absorption data for many common construction materials. The material RF absorption data 210 can be a table or database, or can include data retrieved from an external database or website as needed. Simple models of absorption of the RF signal transmitted through one or two obstacles can be generated to verify signal strength and propagation through the structures. Based on the angle of emission in respect to the building infrastructure and number of obstructing walls, the model can predict the direction of the reflected signal and the likely position where the RF receiver needs to be positioned. The RF analysis tool 200 includes a UAV flight plan generator 220 that generates multiple flight plans for multiple UAVs, shown in FIG. 2 as UAV1 flight plan 230A, UAV2 flight plan 230B, . . . , UAVn flight plan 230N. One or more of the UAVs include an RF emitter, and one or more of the UAVs include an RF receiver. The UAV flight plan generator 220 determines the number and type (emitter or receiver) of UAVs to use to provide an RF scan (or inspection) of the construction site. The RF analysis tool 200 receives site specifications 123 that define expected completion of the construction site at different dates, and uses the site specifications 123 to generate the UAV flight plans so the UAVs can effectively perform RF scans of the construction site to determine progress of construction at the construction site. The UAVs are preferably synchronized to within one microsecond, and execute their flight plans using a common time base, thereby allowing the UAVs to move with each other in a coordinated fashion to perform RF scans of a construction site such that RF data from the UAVs can be used to determine progress of construction at the construction site.

The RF analysis tool 200 also includes a UAV deployer 240 that downloads the UAV flight plans to respective UAVs, deploys the UAVs from their place of origin to the construction site to perform RF scans and to collect RF data, and returns the UAVs to the place of origin. The RF analysis tool 200 additionally includes a UAV data retriever 250 that retrieves UAV RF data 260 from all deployed UAVs that have an RF receiver. The RF analysis tool 200 also includes an RF data processor 270 that processes the UAV RF data 260 using RF spectroscopy. The processed RF data is compared to the site specifications 123, and uses the material RF absorption data 210 to determine the progress specifications 127 at the construction site. The progress specifications 127 are then compared to the expected progress from the site specifications 123 to determine progress at the construction site. The RF analysis tool 200 thus uses the site specifications 123 and material RF absorption data 210 to generate flights plans for multiple UAVs that will work in a coordinated fashion to provide UAV RF data 260, which is then used in conjunction with the site specifications 123 and the material RF absorption data 210 to generate progress specifications 127. The RF analysis tool thus determines progress at a construction site without the need for humans to travel to the construction to visually verify the progress.

Figure 3:
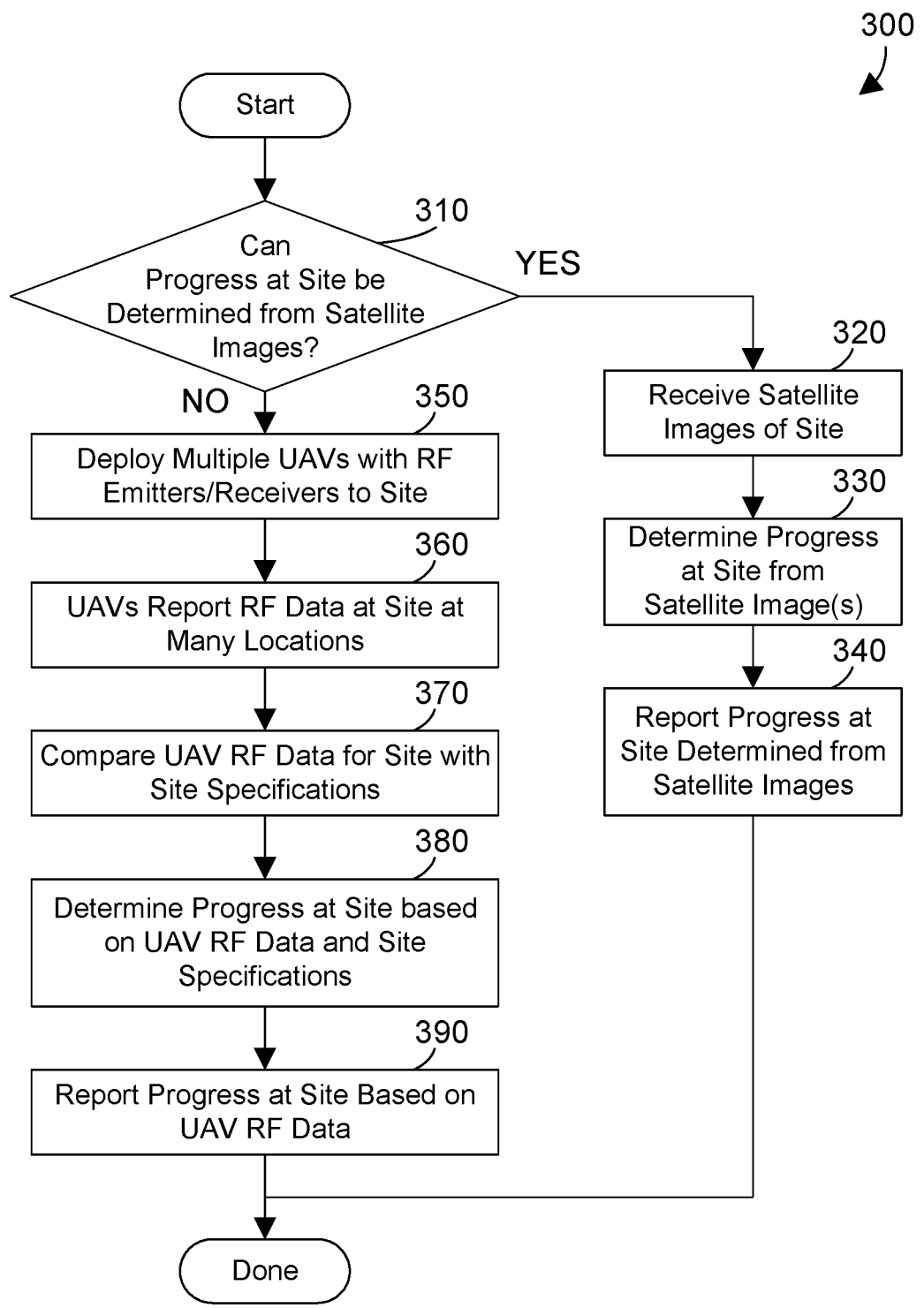
FIG. 3 is a flow diagram of a method for remotely monitoring progress at a construction site.

Referring to FIG. 3, a method 300 is preferably performed by the progress tracker 124 shown in FIG. 1. When the progress at a construction site can be determined from satellite images (step 310=YES), one or more satellite images of the site are received (step 320). The satellite images can be retrieved from any suitable source, including commercial satellite services that provide satellite images on request for a fee. Progress at the site is determined from the satellite image(s) (step 330), and is reported (step 340). When the progress at a construction site cannot be determined from satellite images (step 310=NO), multiple UAVs with RF emitters and/or receivers are deployed to the site (step 350). One or more of the UAVs includes an RF emitter, and one or more UAVs includes an RF receiver. The UAVs execute programmed flight plans to act in a coordinated fashion with each other to perform RF scans of the construction site. The UAVs report RF data at many locations on the construction site (step 360). The UAV RF data for the site is the compared with the site specifications (step 370). The progress at the site is determined based on the UAV RF data and the site specifications (step 380). The progress at the site based on the UAV RF data (step 390). Method 300 is then done.

FIG. 4 shows a table 410 that is one specific example for material RF absorption data 210 shown in FIG. 2. Table 410 includes material RF absorption data for nine different materials at a construction site at six different frequencies. Thus, brick will absorb 5% of RF energy at 2 kHz. Carpet on concrete with a foam rubber pad will absorb 24% of RF energy at 250 Hz, but will absorb 73% of the RF energy at 4 kHz. Table 410 is shown in FIG. 4 as one very simple example. The material RF absorption data 210 could include a large table or database that includes RF absorption data for a large number of different construction materials, rather than the nine shown in FIG. 4.

Figure 5:
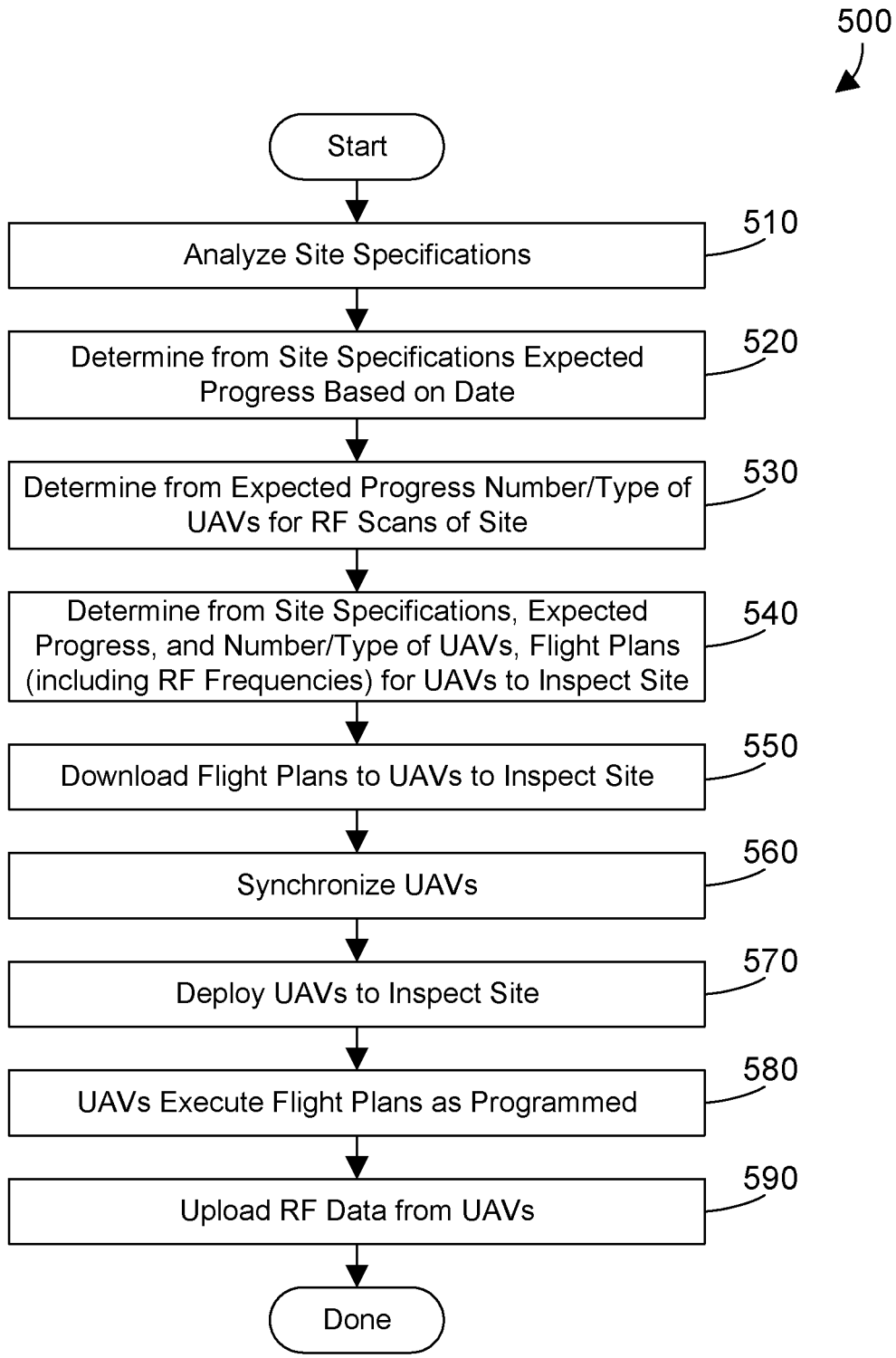
FIG. 5 is a flow diagram of a method for using UAVs to acquire RF data from which progress at a construction site can be determined.

Referring to FIG. 5, a method 500 is preferably performed by the RF analysis tool 126 in FIG. 1 or by the RF analysis tool 200 in FIG. 2. The site specifications are analyzed (step 510) to determine which materials should be present at the construction site at a given date, which represents expected progress based on date (step 520). A suitable number and type of UAVs to perform RF scans of the site are determined from the expected progress (step 530). Each UAV can include an RF emitter and/or an RF receiver. In one specific implementation, one or more of the UAVs may include both an RF emitter and an RF transmitter, allowing the UAV to emit RF energy at some points during the flight plan and to receive RF energy at other points during the flight plan. One example of a suitable wide-range RF emitter that could be use on a UAV is the HMC835LP6GE from Analog Devices, or the MMA029AA from Microsemi. The number and type of UAVs can depend on numerous factors, including the number of available UAVs, their respective capabilities as RF emitters, RF receivers, or both, the size of the construction site, the number of buildings to be scanned, the desired time window for performing the scans, etc.

UAV flight plans, including RF frequencies, for the UAVs to inspect the construction site using RF scans are then determined from the site specification, expected progress, and number/type of UAVs (step 540). The UAV flight plans most preferably include multiple steps that are each time-based, so each UAV executes a step at the same time the other UAVs are executing a corresponding step. This allows the UAVs to behave as a coordinated swarm. The flight plans are downloaded to the UAVs (step 550). The UAVs are synchronized (step 560), most preferably within one microsecond of each other. The UAVs are then deployed to inspect the site (step 570). Note the term "inspect the site" as used herein means the UAVs work in a coordinated manner to take many RF scans of the construction site. The UAVs execute their respective flight plans as programmed (step 580). For example, once the UAVs arrive at the site, the UAVs preferably position themselves for the first scan, then execute the remaining steps in their respective flight plans in synchronization, with one or more UAVs emitting RF signals and others receiving RF signals and recording the received RF signals at each step. Once the UAVs return to their point of origin, the RF data from the UAVs, also referred to as UAV RF data herein, is uploaded (step 590), and can then be analyzed to determine the progress specifications for the construction site, as described at steps 370 and 380 in FIG. 3. Method 500 is then done. In a variation of method 500 in FIG. 5, the RF data uploaded from the UAVs in step 590 could be done near real-time as the RF data is collected by the UAVs, such as while the UAVs are executing their flight plans, instead of waiting until the UAVs have returned back to the point of origin.

Figures 6, 7:
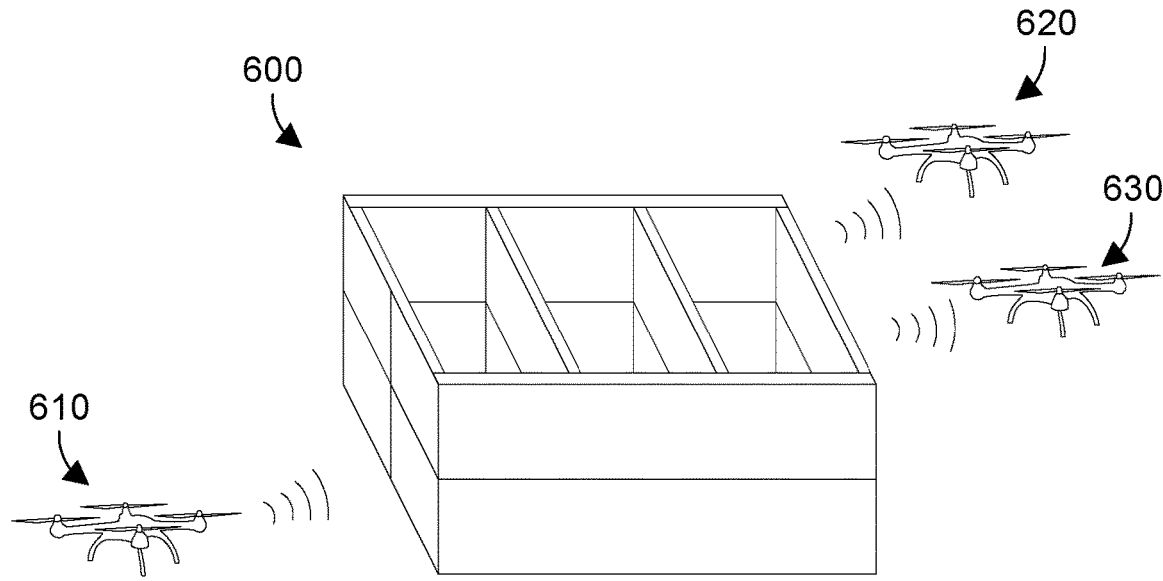
FIG. 6 is a diagram showing the use of three UAVs to generate UAV RF data from which progress at a construction site can be determined.
FIG. 7 is a table showing a simplified flight plan for the emitter UAV 610 in FIG. 6.

FIG. 6 shows a building 600 that represents a construction project, with a first UAV 610 that has an RF emitter, and two UAVs 620 and 630 that each include an RF receiver. When the three UAVs 610, 620 and 630 start the steps of their flight plans for scanning the building 600, the receiver UAVs 620 and 630 move in a coordinated manner with the emitter UAV 610 to receive the RF signal from the emitter UAV 610 through some portion of the building 600. The site specifications will indicate the expected features of the building and their composition at a specified date. The RF signals received by the two receiver UAVs 620 and 630 can be analyzed using the site specifications to determine the progress of completing the building 600. An interior wall that includes drywall will absorb or attenuate an RF signal of a given frequency differently than an interior wall that does not include drywall. The RF signals received by the receiver UAVs 620 and 630 can thus be compared with the RF signal emitted by the emitter UAV 610, and based on the site specifications, the material RF absorption data for different materials, and the UAV RF data, the RF analysis tool can determine whether the building has been completed to the specified degree. Thus, for example, a determination can be made using the UAVs in FIG. 6 whether or not drywall has been installed in the interior of the building 600.

For the specific example in FIG. 6, we assume UAV 610 has an RF emitter and UAVs 620 and 630 have an RF receiver. Note, however, that all three UAVs 610, 620 and 630 could be equipped with both emitters and receivers. A UAV could thus change role from emitter to receiver or from receiver to emitter at any point during the flight plan. To use one very simple example, a first UAV could be positioned on one side of a building and a second UAV could be positioned on the opposite side of the building so the RF signals between the two will pass through the building. The first UAV could then emit RF signals while the second UAV receives the RF signals. The roles could then swap, with the second UAV emitting RF signals while the first UAV receives those signals. The disclosure and claims herein expressly extend to using a UAV that has only an RF emitter, to using a UAV that has only an RF receiver, or to using a UAV that includes both RF emitter and RF receiver that can be selectively turned on and off during the flight plan as needed.

FIG. 7 shows a sample flight plan 710 for the emitter UAV 610 shown in FIG. 6. We assume the flight plan 710 is described in steps, with each step in an emitter UAV having corresponding steps in one or more receiver UAVs. Because the UAVs are synchronized, preferably within one microsecond of each other, each UAV will be executing the same number of step in their respective flight plans at the same time. This allows the UAVs to function and move in a coordinated cluster. We further assume for this specific example UAV 610 only emits RF signals during its flight plan 710. The flight plan 710 has a number of steps, shown in FIG. 7 as steps 1, 2, 3, 4, . . . , N. Each step specifies a start time, a stop time, coordinates, direction, frequency, and type. The start time can be specified in absolute time, or can be a time relative to some specified beginning, such as the beginning flight time of the UAV, or the beginning of the first scan after the UAVs have arrived at the construction site and are at their designated coordinates for the first step in their respective flight plans. For the example in FIG. 7, we assume the start time T is the beginning of when the UAVs all begin step 1 of their respective flight plans. We assume for this example the emitter UAV 610 in step 1 emits an RF signal for ten seconds, from T to T+10. We assume the coordinates specify a position in three-dimensional space, and can be specified in any suitable manner, including cartesian coordinates, GPS coordinates with elevation, etc. For the specific example in FIG. 7, we assume the coordinates are specified in cartesian coordinates with respect to two reference axes defined in the site specifications, with the third coordinate specifying a height. The direction column specifies a direction for the UAV to face during each step. In this specific example, we assume the direction column includes a specification of an angle from zero to 360° that is defined with respect to the axes defined in the site specifications. The frequency column specifies the RF frequency for the emitter, while the type column specifies the type of RF emission, whether continuous or pulsed with a specified duty cycle. The type of RF emitted, continuous or pulsed, is transmitted to one or more UAVs carrying an RF receiver so the RF receiver(s) can recognize the pattern expected from the RF emitter. The flight plan 710 also assumes there is a ten second gap between the end of step 1 (T+10) and the beginning of step 2 (T+20) to give the UAVs ten seconds to reposition themselves to the new coordinates of the next step before beginning the next step.

The execution of the UAV flight plan 710 in FIG. 7 results in the UAV 610 in FIG. 6 flying to coordinates 52,286 on some X,Y coordinates of the building site, at an elevation of four feet, with its emitter set to broadcast a continuous 500 Hz RF signal. This continuous RF signal at 500 Hz is broadcast in step 1 for ten seconds from T to T+10. The UAV 610 will then move up six feet in elevation to coordinates 52,296,10 between T+10 and T+20, and sets its RF emitter to broadcast a 250 Hz RF signal at 30% duty cycle. The 250 Hz signal at 30% duty cycle is broadcast in step 2 for ten seconds from T+20 to T+30. The UAV 610 will then move to coordinates 52,375 at 14 feet elevation between T+30 and T+40, and sets its RF emitter to broadcast a 1 kHz RF signal at 70% duty cycle. The 1 kHz signal at 70% duty cycle is broadcast in step 3 for ten seconds from T+40 to T+50. The UAV 610 will then move down seven feet in elevation to coordinates 52,375,7 between T+50 and T+60, and sets its RF emitter to broadcast a continuous 125 Hz RF signal. The continuous 125 Hz signal is broadcast in step 4 for ten seconds from T+60 to T+70. The UAV 610 will then continue executing the remaining steps in its flight plan 710. This very simplified flight plan 710 in FIG. 7 illustrates that a flight plan for an emitter UAV can be synchronized with flight plans of receiver UAVs to generate UAV RF data in the receiver UAVs, from which progress of a construction site can be determined.

Figures 8, 9:
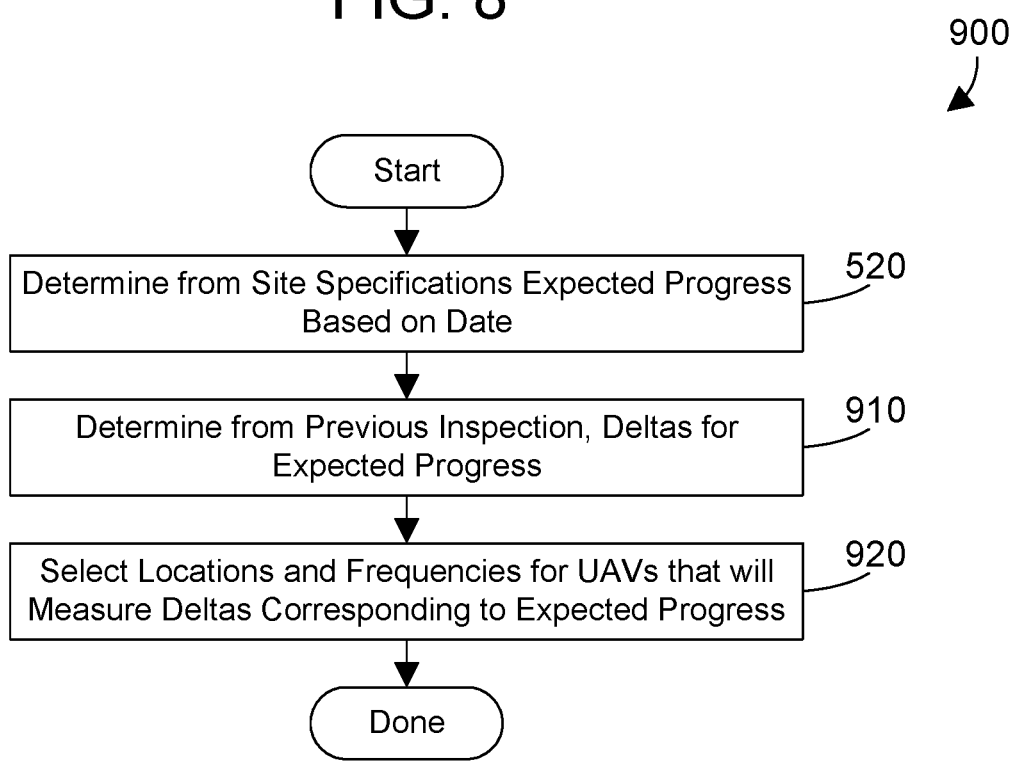
FIG. 8 is a table showing a simplified flight plan for one of the receiver UAVs 620 in FIG. 6.
FIG. 9 is a flow diagram of a method for determining locations and frequencies of UAVs based on deltas for expected progress based on one or more previous inspections.

A sample flight plan 810 for the receiver UAV 620 in FIG. 6 is shown in FIG. 8. It includes steps that correspond to steps of the same number in the flight plan 710 shown in FIG. 7 for the emitter UAV 610. The UAV 620 will fly to coordinates 223,286,4 facing a direction of 180 degrees, and record during step 1 the RF signals received from T to T+10. The UAV 620 will then fly down seven feet in elevation to coordinates 223,286,10 between T+10 and T+20, and will record during step 2 the RF signals received from T+20 to T+30. The UAV 620 will then fly to coordinates 223,375,14 between T+30 and T+40, and will record during step 3 the RF signals received from T+40 to T+50. The UAV 620 will then fly down seven feet in elevation to 223,375,7 between T+50 and T+60, and will record during step 4 the RF signals received from T+60 to T+70. The UAV 620 will then execute the remaining steps in its flight plan in sequence with the same steps in the emitter flight plan 710 shown in FIG. 7. The result is the UAV 610 and UAV 620 move in a coordinated fashion with each other to provide a desired number of scans at a desired number of locations, as defined in the flight plans. The receiver UAVs 620 and 630, once they have executed their flight plans, will have UAV RF data stored, from which the progress of the construction site can be derived by the RF analysis tool 126 in FIG. 1 and 200 in FIG. 2.

The flight plans in FIGS. 7 and 8 are extremely simplified for the purpose of illustration. Many variations in flight plans are within the scope of the disclosure and claims herein. For example, a UAV may include the capability of rotating and tilting its RF emitter or RF receiver up or down. When this is the case, the Direction column in the flight plan could include not only an angular direction for pointing the emitter or receiver, but could additionally include an azimuth angle for tilting the emitter or receiver. This could allow, for example, a UAV with an RF emitter to be positioned at a coordinate that is close to the ground pointed at a structure with the emitter tilted at a 30 degree angle up, and a UAV with a receiver could then be positioned on an opposite site of the structure at a much higher elevation with its RF receiver pointed at a 30 degree angle down, thereby allowing the RF receiver to receive RF energy from the RF emitter after passing through both walls and floor/ceilings between the RF emitter and the RF receiver. In addition, the flight plans can result in scans at multiple angles. Thus, a UAV with an RF emitter could be placed at a corner of a structure, a UAV with an RF receiver could be placed at the far opposite corner of the building, and the resulting RF energy emitted by the RF emitter would then pass through numerous walls at an angle before reaching the RF receiver. In addition, when a UAV is equipped with both an RF emitter and an RF receiver, the UAV can change from an RF emitter to an RF receiver in different steps in its flight plan. In addition, each step in a flight plan need not have the same time value as other steps. Thus, while the steps in FIGS. 7 and 8 are shown to last for ten second each, it is equally within the scope of the disclosure and claims herein to provide steps that have different durations.

These simple examples illustrate the flight plans for UAVs can include any suitable number of steps with the UAVs functioning in either emitter mode or receiver mode in each step, positioned so the RF energy penetrates any suitable number of walls, floors, ceilings, the roof, etc.

Referring to FIG. 9, a method 900 shows how expected progress can be derived from site specifications and previous inspections of the construction site using UAVs. The expected progress is determined from the site specifications based on date (step 520). Note this is the same step 520 shown in FIG. 5. Assuming a previous inspection has been performed by UAVs, deltas for expected progress can be derived from the previous inspection (step 910). Thus, if the previous inspection was before drywall was installed on interior walls, and if the current inspection is for the purpose of determining whether the drywall has been installed on the interior walls, the delta for expected progress could be the change that would result in the RF signal from various locations of RF emitter(s) and RF receiver(s) due to the addition of the drywall. The locations and frequencies for the UAV flight plans will be set to measure the deltas corresponding to the expected progress (step 920). Method 900 is then done. Method 900 in FIG. 9 allows simplifying a flight plan to focus on expected progress. Thus, if an earlier inspection was for the purpose of verifying the roof was completed, many of the scans of the roof could be omitted if the current inspection is for the purpose of verifying that drywall was installed on the interior walls.

Figure 10:
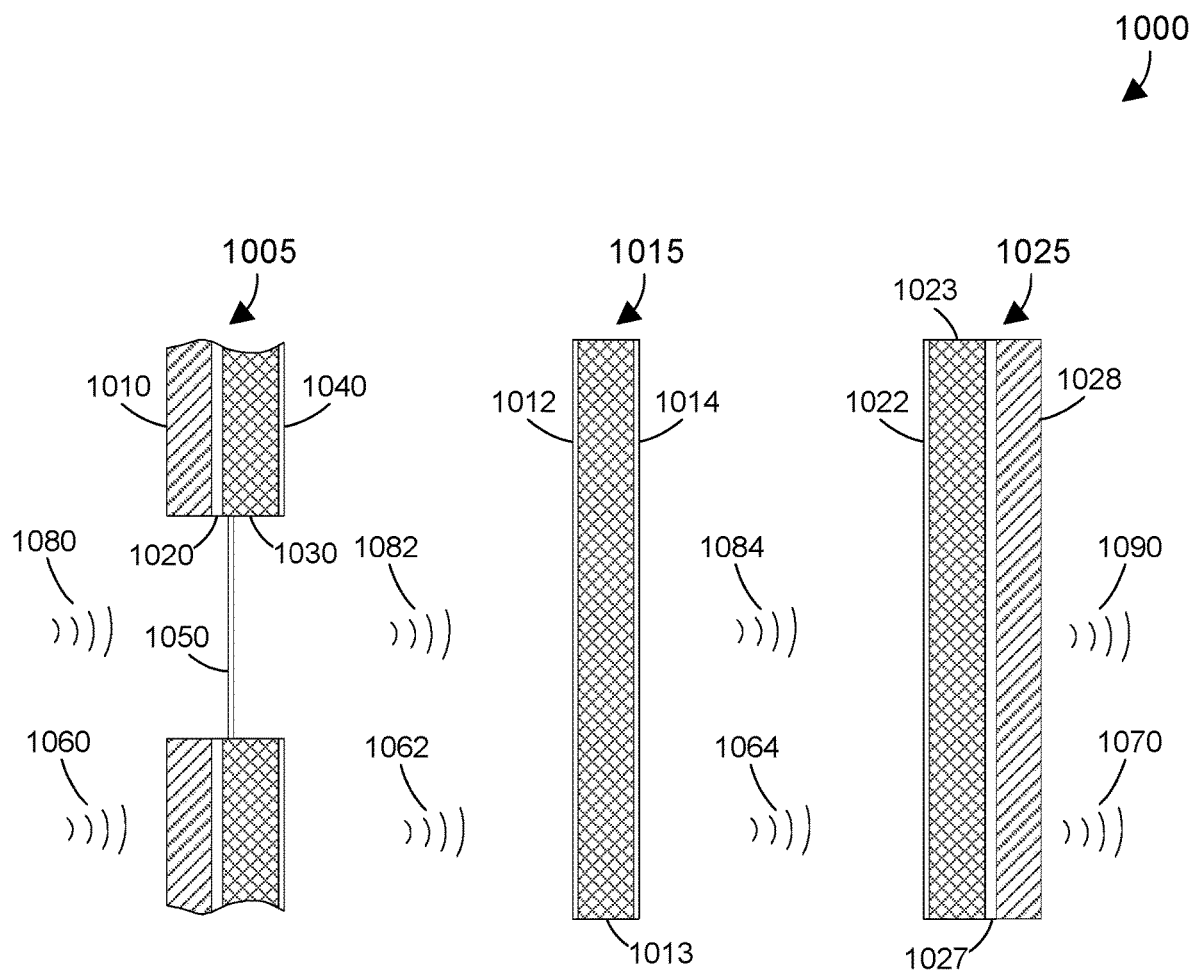
FIG. 10 is cross-sectional diagram showing how RF waves emitted from one emitter UAV outside a building can penetrate an outer wall, an inner wall, and an outer wall to arrive at a receiver UAV positioned on the other side of the building.

FIG. 10 shows a cut-away cross-sectional portion of a building 1000 to illustrate some of the concepts discussed herein. FIG. 10 shows a portion 1005 of an exterior wall of a building that includes a window 1050. The exterior wall includes a brick layer 1010, a layer of insulating foam board 1020, a wood frame wall 1030, and drywall 1040 on the interior portion of the wall. An interior wall 1015 is also shown that includes a wood frame wall 1013 that has drywall 1012 on the side facing the exterior wall 1005 and has drywall 1014 on the opposite side. An exterior wall 1025 is shown that includes a wood frame wall 1023 with an interior layer of drywall 1022, a layer of insulating foam board 1027, and an exterior brick layer 1028. We assume these specifications are included in the site specifications for these walls 1005, 1015 and 1025. Inspection of these walls can be performed by flying an emitter UAV to a location and emitting an RF signal shown at 1060 in FIG. 10. This RF signal propagates through the exterior wall 1005, being absorbed by, and therefore attenuated by, the materials in the exterior wall 1005. The signal after propagating through the exterior wall 1005 is shown at 1062 in FIG. 10. The signal at 1062 then propagates through the interior wall 1015, being absorbed by, and therefore attenuated by, the materials in the interior wall 1015. The signal after propagating through the interior wall 1015 is shown at 1064. This RF signal at 1064 then propagates through the exterior wall 1025, being absorbed by, and therefore attenuated by, the materials in the exterior wall 1025. The signal after propagating through the exterior wall 1025 is shown at 1070. The RF signal 1070 can then be received by an RF receiver on a UAV that has been positioned to receive RF signal 1070 at a position outside the exterior wall 1025.

FIG. 10 shows a second RF signal 1080 that propagates through the window 1050 to 1082, then through the interior wall 1015 to 1084, then through the exterior wall 1025 at 1090. This shows that a position for a UAV emitter can be changed to provide substantially different results. Thus, the RF signal at 1060 passes through the brick, foam, wood frame wall, and drywall in the exterior wall 1005 while the RF signal at 1080 passes through a window 1050 in the wall instead, causing significantly different attenuation of these two RF signals at 1062 and 1082. Note, however, the location of the window 1050 is in the site specifications, so a flight plan can specify for a UAV to emit the RF signal 1060 at a specified location, knowing it will pass first through the four layers of the exterior wall, or could alternatively (or in addition to) specify for a UAV to emit the RF signal at 1080 outside the window 1050, knowing it will pass through the window 1050 without passing through the four layers in the part of the exterior wall 1015 on both sides of the window 1050.

FIG. 10 illustrates that a flight plan for an emitter UAV can take into account the features of a construction site so the flight plan can be optimized. Thus, if the purpose of an inspection is to verify the drywall 1040, 1020, 1014 and 1022 has been installed, an emitter UAV positioned at 1080 to emit through the window 1050 will result in a signal at 1082 that has not been attenuated by the brick layer 1010, foam layer 1020, wood frame wall 1030, and drywall 1040 in the exterior wall 1005. If an emitter UAV were to emit both RF signals 1060 and 1080 at different steps in its flight plan, the UAV RF data received by the receiver UAV(s) could be compared to assure the data from the two positions are consistent.

Figure 11:
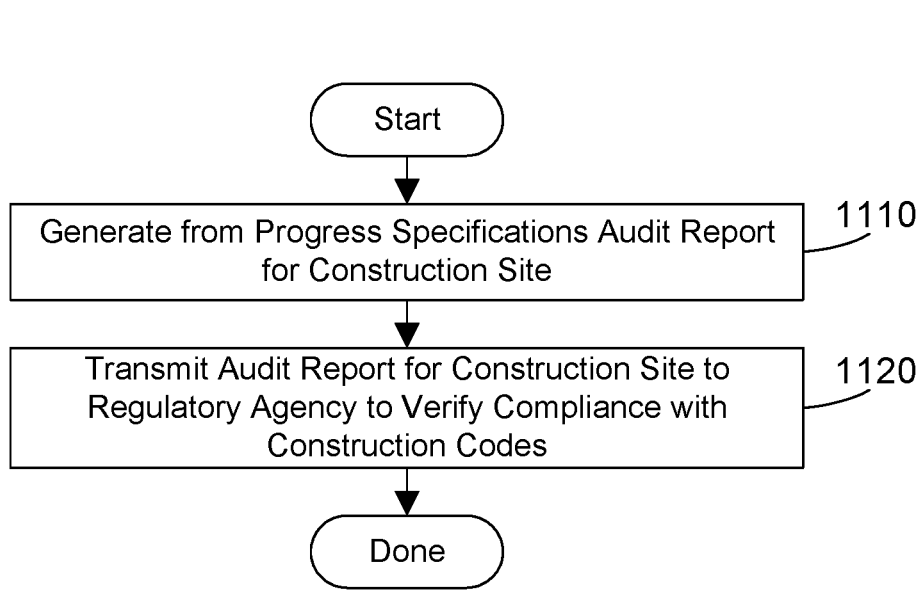
FIG. 11 is a flow diagram of a method for transmitting an audit report to a regulatory agency.
Figure 12:
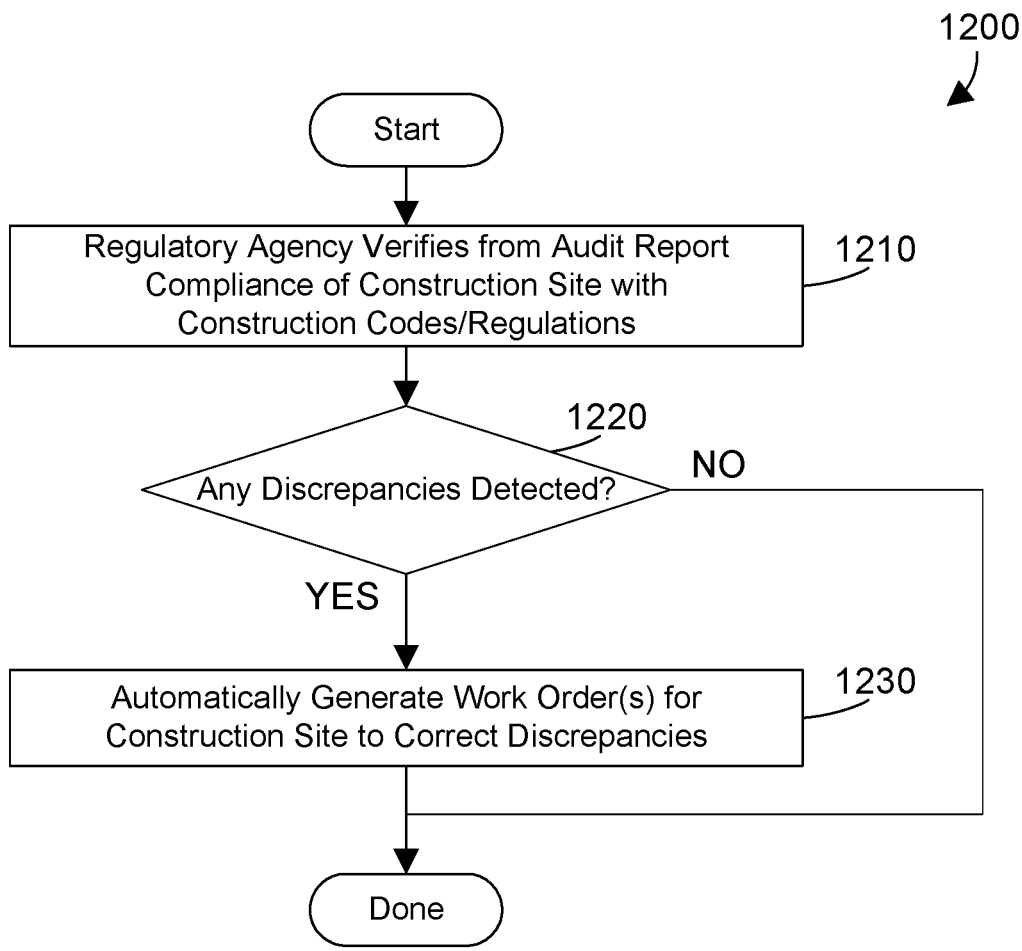
FIG. 12 is a flow diagram to automatically generate one or more work orders for a construction site to correct discrepancies.

The progress specifications 127 shown in FIG. 1 that are generated from the RF data from the UAVs can be used to generate an audit report for a regulatory agency. Referring to FIG. 11, a method 1100 begins by generating an audit report for the construction site from the progress specifications (step 1110). The audit report is then transmitted to a regulatory agency to verify compliance with construction codes (step 1120). Method 1100 is then done. Referring to FIG. 12, a method 1200 begins with the regulatory agency verifying from the audit report compliance of the construction site with applicable construction codes/regulations (step 1210). When no discrepancies are detected between the audit report and the construction codes/regulations (step 1220=NO), method 1200 is done. When one or more discrepancies are detected (step 1220=YES), one or more work orders are automatically generated for the construction site to correct the discrepancies (step 1230). Method 1200 is then done. Methods 1100 and 1200 in FIGS. 11 and 12, respectively, illustrate that progress specifications 127 can be used not only for the construction company, but can generate audit reports for a regulatory agency as well, which can then automatically generate work orders to correct any discrepancies.

The ability to remotely monitor progress at construction sites could be very beneficial to lenders that provide loans for construction projects. Instead of sending people to the construction site to verify completion of each phase, which typically triggers release of additional funds in a construction loan, a lender could use the system and methods disclosed herein to remotely monitor the progress at a construction site, thereby significantly reducing its overhead in monitoring progress at construction sites.

The disclosure and claims herein support an apparatus comprising: at least one processor; a memory coupled to the at least one processor; site specifications residing in the memory that include specifications for a construction site at each of a plurality of dates; and a progress tracker residing in the memory and executed by the at least one processor, the progress tracker comprising: a radio frequency (RF) analysis tool that deploys a plurality of unmanned aerial vehicles (UAVs) to the construction site to determine progress at the construction site, wherein a first of the plurality of UAVs comprises an RF emitter and a second of the plurality of UAVs comprises an RF receiver, wherein the first UAV is positioned to emit RF energy towards a structure on the construction site and the second UAV is positioned to receive the RF energy emitted by the first UAV that penetrates the structure, wherein the RF energy received by the second UAV is used by the RF analysis tool to generate, based on a database of material RF absorption data, progress specifications for the structure from which progress of construction of the structure is determined.

The disclosure and claims herein further support a method for determining progress at a construction site, the method comprising: providing site specifications that include specifications for a construction site at each of a plurality of dates; deploying a plurality of unmanned aerial vehicles (UAVs) to the construction site to determine progress at the construction site, wherein a first of the plurality of UAVs comprises an RF emitter and a second of the plurality of UAVs comprises an RF receiver; positioning the first UAV to emit RF energy towards a structure on the construction site; positioning the second UAV to receive the RF energy emitted by the first UAV that penetrates the structure; uploading the RF energy received by the second UAV; and analyzing the RF energy received by the second UAV to generate, based on a database of material RF absorption data and the site specifications, progress specifications for the structure from which progress of construction of the structure is determined.

The disclosure and claims herein additionally support a method for determining progress at a construction site, the method comprising: providing site specifications that include specifications for a construction site at each of a plurality of dates; providing a database of material RF absorption data; reading satellite imaging data for the construction site; determining from the site specifications expected progress based on a date; when progress at the construction site can be determined from the satellite imaging data, determining the progress at the construction site from the satellite imaging data and comparing the progress determined from the satellite imaging data to the expected progress; when progress at the construction site cannot be determined from the satellite imaging data: determining from the expected progress a number and type of unmanned aerial vehicles (UAVs) to perform RF scans at the construction site; determining from the site specifications, expected progress, and number and type of UAVs, a plurality of flight plans for a corresponding plurality of UAVs to perform a plurality of RF scans at the construction site; downloading the flight plans to the plurality of UAVs, wherein a first of the plurality of UAVs comprises an RF emitter and a second of the plurality of UAVs comprises an RF receiver; synchronizing the plurality of UAVs; programming each of the plurality of UAVs with a corresponding flight plan; deploying the plurality of UAVs to the construction site; the plurality of UAVs executing their respective flight plans, moving in a coordinated fashion to perform the plurality of RF scans at the construction site, wherein executing the respective flight plans by the first UAV and the second UAV comprises: positioning the first UAV to emit RF energy towards a structure on the construction site; positioning the second UAV to receive the RF energy emitted by the first UAV that penetrates the structure; uploading the RF energy received by the second UAV; and analyzing the RF energy received by the second UAV to generate, based on the database of material RF absorption data and the site specifications, progress specifications for the structure from which progress of construction of the structure is determined.

A system and method provide remote tracking of progress at construction sites. When possible, the progress can be monitored remotely via satellite imagery. But once satellite imagery cannot determine the progress that needs to be monitored at the construction site, multiple unmanned aerial vehicles (UAVs) that use RF emitters and receivers are deployed to the construction site to determine progress based on RF scans. A number and type of UAVs, along with their respective flight plans, are determined from site specifications and expected progress at the construction site. The UAVs are programmed with their respective flight plans, synchronized, then deployed to inspect the construction site using RF scans. The UAVs execute their respective flight plans, with some emitting RF signals and others receiving those emitted RF signals. The UAV RF data is then analyzed and compared to the site specifications to determine the progress at the construction site.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   site specifications residing in the memory that include specifications for a construction site at each of a plurality of dates; and
   a progress tracker residing in the memory and executed by the at least one processor, the progress tracker comprising:
      a radio frequency (RF) analysis tool that deploys a plurality of unmanned aerial vehicles (UAVs) to the construction site to determine progress at the construction site, wherein a first of the plurality of UAVs comprises an RF emitter and a second of the plurality of UAVs comprises an RF receiver, wherein the first UAV is positioned to emit RF energy towards a structure on the construction site and the second UAV is positioned to receive the RF energy emitted by the first UAV that penetrates the structure, wherein the RF energy received by the second UAV is used by the RF analysis tool to generate, based on a database of material RF absorption data, progress specifications for the structure from which progress of construction of the structure is determined.

2. The apparatus of claim 1 wherein the plurality of UAVs are synchronized and each of the plurality of UAVs is programmed with a flight plan that includes a plurality of RF scans at a plurality of locations that allow accurately performing RF analysis of the RF energy received by the plurality of UAVs.

3. The apparatus of claim 1 wherein the progress tracker further comprises satellite imaging data, wherein when the progress tracker can determine progress at the construction site from the satellite imaging data, the progress tracker determines the progress at the construction site from the satellite imaging data without using the RF analysis tool to deploy the plurality of UAVs, and when the progress tracker cannot determine the progress at the construction site from the satellite imaging data, the progress tracker deploys the plurality of UAVs to the construction site.

4. The apparatus of claim 1 wherein the RF analysis tool comprises a UAV flight plan generator that generates, based on the site specifications for a selected date, flight plans for each of the plurality of UAVs that allow the plurality of UAVs to act in a coordinated fashion to perform a plurality of RF scans of the structure.

5. The apparatus of claim 4 wherein each flight plan comprises a plurality of steps that each include a specified time period, wherein each of the plurality of UAVs executes each step substantially simultaneously to produce a coordinated movement and function of the plurality of UAVs.

6. The apparatus of claim 5 wherein each step in each flight plan further comprises coordinates for positioning the corresponding UAV and a direction for pointing an RF emitter or an RF receiver on the corresponding UAV.

7. The apparatus of claim 6 wherein each step in each flight plan that corresponds to emitting RF energy from an RF emitter specifies an RF frequency and duty cycle for the RF energy.

8. The apparatus of claim 4 wherein the flight plans generated by the UAV flight plan generator are based on deltas from at least one previous inspection of the construction site.

9. The apparatus of claim 1 wherein the RF analysis tool determines from the site specifications for the selected date a number and type of the plurality of UAVs to deploy to the construction site.

10. A method for determining progress at a construction site, the method comprising:
    providing site specifications that include specifications for a construction site at each of a plurality of dates;
    deploying a plurality of unmanned aerial vehicles (UAVs) to the construction site to determine progress at the construction site, wherein a first of the plurality of UAVs comprises an RF emitter and a second of the plurality of UAVs comprises an RF receiver;
    positioning the first UAV to emit RF energy towards a structure on the construction site;
    positioning the second UAV to receive the RF energy emitted by the first UAV that penetrates the structure;
    uploading the RF energy received by the second UAV; and
    analyzing the RF energy received by the second UAV to generate, based on a database of material RF absorption data and the site specifications, progress specifications for the structure from which progress of construction of the structure is determined.

11. The method of claim 10 further comprising:
    synchronizing the plurality of UAVs; and
    programming each of the plurality of UAVs with a flight plan that includes a plurality of locations that allows accurately performing RF analysis of the RF energy received by the plurality of UAVs.

12. The method of claim 10 further comprising:
    reading satellite imaging data;
    when progress at the construction site can be determined from the satellite imaging data, determining the progress at the construction site from the satellite imaging data without deploying the plurality of UAVs; and
    when the progress tracker cannot determine the progress at the construction site from the satellite imaging data, the progress tracker deploys the plurality of UAVs to the construction site.

13. The method of claim 10 further comprising:
    generating, based on the site specifications for a selected date, flight plans for each of the plurality of UAVs that allow the plurality of UAVs to act in a coordinated manner to perform a plurality of RF scans of the structure.

14. The method of claim 13 wherein each flight plan comprises a plurality of steps that each include a specified time period, wherein each of the plurality of UAVs executes each step substantially simultaneously to produce a coordinated movement and function of the plurality of UAVs.

15. The method of claim 14 wherein each step in each flight plan further comprises coordinates for positioning the corresponding UAV and a direction for pointing an RF emitter or an RF receiver on the corresponding UAV.

16. The method of claim 15 wherein each step in each flight plan that corresponds to emitting RF energy from an RF emitter specifies an RF frequency and duty cycle for the RF energy.

17. The method of claim 10 wherein the flight plans are based on deltas from at least one previous inspection of the construction site.

18. The method of claim 10 further comprising:
determining from the site specifications for the selected date a number and type of the plurality of UAVs to deploy to the construction site.

19. A method for determining progress at a construction site, the method comprising:
providing site specifications that include specifications for a construction site at each of a plurality of dates;
providing a database of material RF absorption data;
reading satellite imaging data for the construction site;
determining from the site specifications expected progress based on a date;
when progress at the construction site can be determined from the satellite imaging data, determining the progress at the construction site from the satellite imaging data and comparing the progress determined from the satellite imaging data to the expected progress;
when progress at the construction site cannot be determined from the satellite imaging data:
determining from the expected progress a number and type of unmanned aerial vehicles (UAVs) to perform RF scans at the construction site;
determining from the site specifications, expected progress, and number and type of UAVs, a plurality of flight plans for a corresponding plurality of UAVs to perform a plurality of RF scans at the construction site;
downloading the flight plans to the plurality of UAVs, wherein a first of the plurality of UAVs comprises an RF emitter and a second of the plurality of UAVs comprises an RF receiver;
synchronizing the plurality of UAVs;
programming each of the plurality of UAVs with a corresponding flight plan;
deploying the plurality of UAVs to the construction site;
the plurality of UAVs executing their respective flight plans, moving in a coordinated fashion to perform the plurality of RF scans at the construction site, wherein executing the respective flight plans by the first UAV and the second UAV comprises:
positioning the first UAV to emit RF energy towards a structure on the construction site;
positioning the second UAV to receive the RF energy emitted by the first UAV that penetrates the structure;
uploading the RF energy received by the second UAV; and
analyzing the RF energy received by the second UAV to generate, based on the database of material RF absorption data and the site specifications, progress specifications for the structure from which progress of construction of the structure is determined.

20. The method of claim 19 wherein each flight plan comprises:
a plurality of steps that each include a specified time period, wherein each step in each flight plan is executed by its corresponding UAV in a substantially synchronized matter with respect to all other of the plurality of UAVs so the plurality of UAVs act in a coordinated matter;
coordinates for positioning the corresponding UAV;
a direction for pointing an RF emitter or an RF receiver on the corresponding UAV; and
for each step that corresponds to emitting RF energy from an RF emitter, a specified RF frequency and duty cycle.

* * * * *